United States Patent [19]

McCulloch

[11] Patent Number: 6,053,128
[45] Date of Patent: Apr. 25, 2000

[54] SAFETY LEASH

[76] Inventor: Saundra Diane McCulloch, 2627 Briarcliff Dr., Riverbank, Calif. 95367

[21] Appl. No.: 09/065,153

[22] Filed: Apr. 23, 1998

[51] Int. Cl.$^7$ .................................................. A01K 27/00
[52] U.S. Cl. ............................ 119/792; 119/795; 119/798
[58] Field of Search ..................... 119/792, 795, 119/798, 770, 771

[56] References Cited

U.S. PATENT DOCUMENTS

| | | | |
|---|---|---|---|
| 3,441,005 | 4/1969 | Fink ........................................... | 119/798 |
| 4,879,972 | 11/1989 | Crowe et al. ........................... | 119/792 |
| 5,505,162 | 4/1996 | Fleischer et al. ....................... | 119/792 |
| 5,551,379 | 9/1996 | Hart ........................................ | 119/771 |
| 5,701,848 | 12/1997 | Tozawa ................................. | 119/797 |
| 5,852,988 | 12/1998 | Gish ....................................... | 119/795 |

Primary Examiner—Michael J. Carone
Assistant Examiner—Son T. Nguyen

[57] ABSTRACT

A new safety leash for controlling an animal, such as a dog. The inventive device includes an elongate flexible strap having opposite first and second ends. The first end of the flexible strap is looped through the attachment ring of a first clip member. An elongate secondary strap having a pair opposite end portions is coupled to the flexible strap. The secondary strap is looped through the attachment ring of a second clip member.

7 Claims, 2 Drawing Sheets

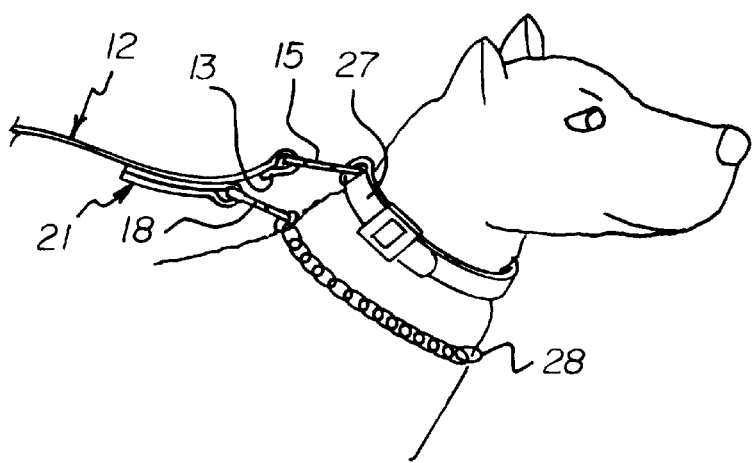
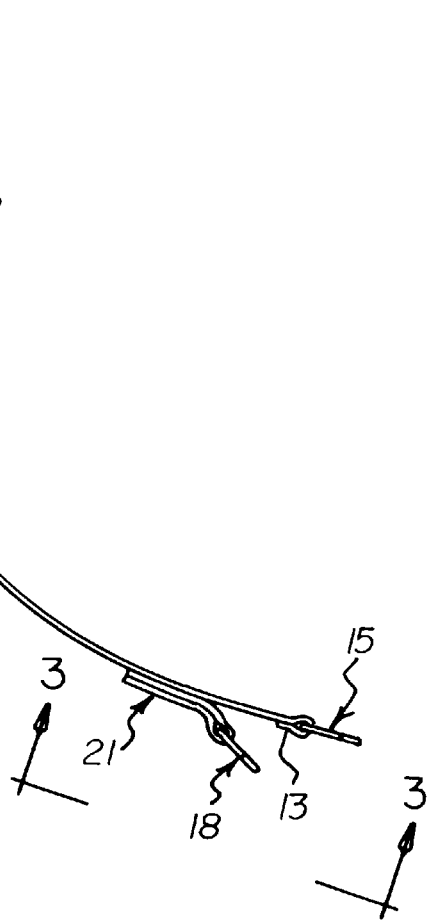

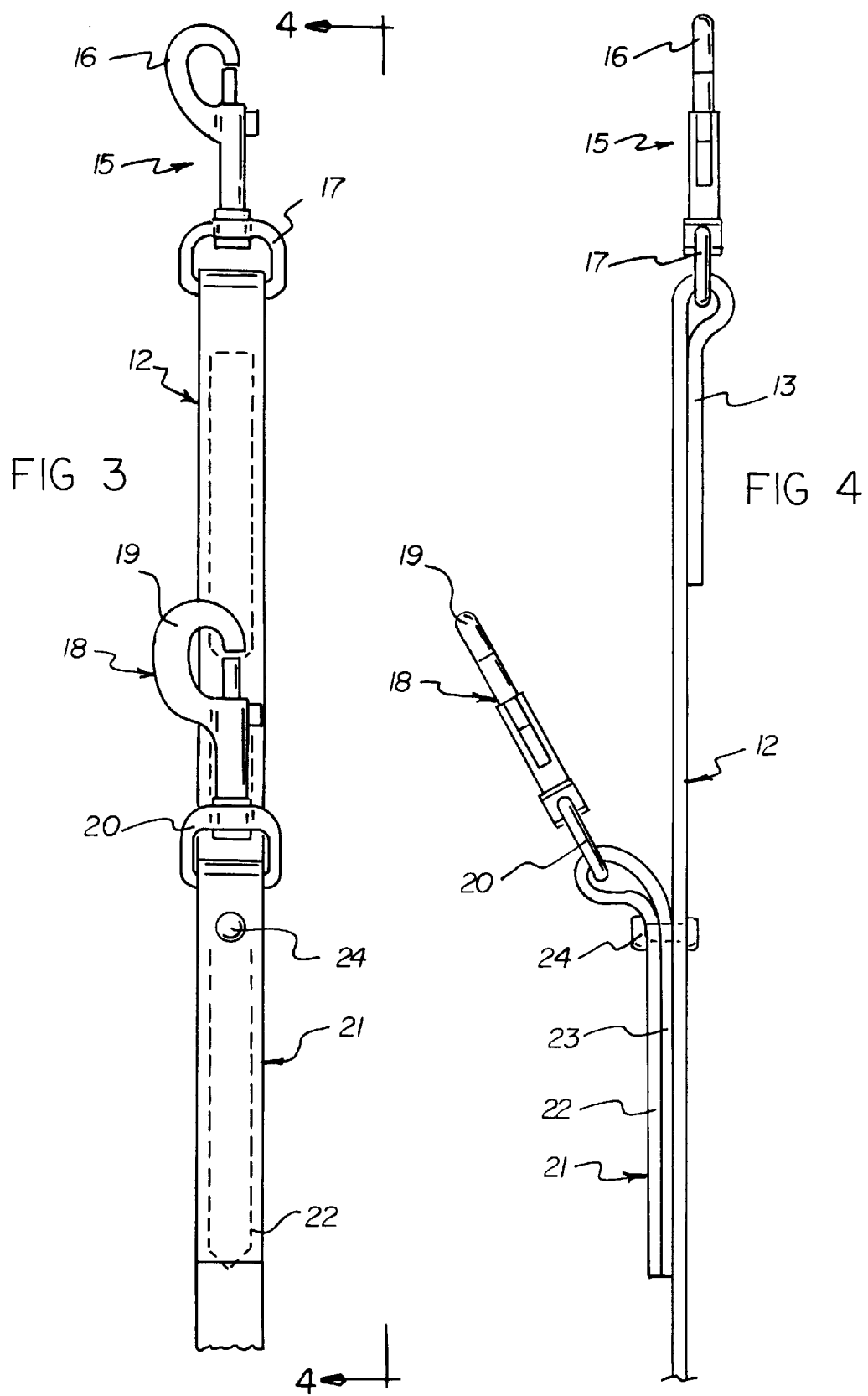

SAFETY LEASH

BACKGROUND OF THE INVENTION

1. Field of the Invention

The present invention relates to leashes and more particularly pertains to a new safety leash for controlling an animal, such as a dog.

2. Description of the Prior Art

The use of leashes is known in the prior art. More specifically, leashes heretofore devised and utilized are known to consist basically of familiar, expected and obvious structural configurations, notwithstanding the myriad of designs encompassed by the crowded prior art which have been developed for the fulfillment of countless objectives and requirements.

Known prior art leashes include U.S. Pat. No. 4,958,597; U.S. Pat. No. 5,005,527; U.S. Pat. No. 4,584,967; U.S. Pat. No. Des. 352,804; U.S. Pat. No. 4,099,799; and U.S. Pat. No. 4,787,340.

While these devices fulfill their respective, particular objectives and requirements, the aforementioned patents do not disclose a new safety leash. The inventive device includes an elongate flexible strap having opposite first and second ends. The first end of the flexible strap is looped through the attachment ring of a first clip member. An elongate secondary strap having a pair opposite end portions is coupled to the flexible strap. The secondary strap is looped through the attachment ring of a second clip member.

In these respects, the safety leash according to the present invention substantially departs from the conventional concepts and designs of the prior art, and in so doing provides an apparatus primarily developed for the purpose of controlling an animal, such as a dog.

SUMMARY OF THE INVENTION

In view of the foregoing disadvantages inherent in the known types of leashes now present in the prior art, the present invention provides a new safety leash construction wherein the same can be utilized for controlling an animal, such as a dog.

The general purpose of the present invention, which will be described subsequently in greater detail, is to provide a new safety leash apparatus and method which has many of the advantages of the leashes mentioned heretofore and many novel features that result in a new safety leash which is not anticipated, rendered obvious, suggested, or even implied by any of the prior art leashes, either alone or in any combination thereof.

To attain this, the present invention generally comprises an elongate flexible strap having opposite first and second ends. The first end of the flexible strap is looped through the attachment ring of a first clip member. An elongate secondary strap having a pair opposite end portions is coupled to the flexible strap. The secondary strap is looped through the attachment ring of a second clip member.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new safety leash apparatus and method which has many of the advantages of the leashes mentioned heretofore and many novel features that result in a new safety leash which is not anticipated, rendered obvious, suggested, or even implied by any of the prior art leashes, either alone or in any combination thereof.

It is another object of the present invention to provide a new safety leash which may be easily and efficiently manufactured and marketed.

It is a further object of the present invention to provide a new safety leash which is of a durable and reliable construction.

An even further object of the present invention is to provide a new safety leash which is susceptible of a low cost of manufacture with regard to both materials and labor, and which accordingly is then susceptible of low prices of sale to the consuming public, thereby making such safety leash economically available to the buying public.

Still yet another object of the present invention is to provide a new safety leash which provides in the apparatuses and methods of the prior art some of the advantages thereof, while simultaneously overcoming some of the disadvantages normally associated therewith.

Still another object of the present invention is to provide a new safety leash for controlling an animal, such as a dog.

Yet another object of the present invention is to provide a new safety leash which includes an elongate flexible strap having opposite first and second ends. The first end of the flexible strap is looped through the attachment ring of a first clip member. An elongate secondary strap having a pair opposite end portions is coupled to the flexible strap. The secondary strap is looped through the attachment ring of a second clip member.

Still yet another object of the present invention is to provide a new safety leash that is attachable to a regular dog pet collar and a control pet collar, such as the type made of chain.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic partial side view of a new safety leash in use according to the present invention.

FIG. 2 is a schematic side view of the present invention.

FIG. 3 is a schematic side view of the first end of the flexible strap of the present invention.

FIG. 4 is a schematic another side view of the first end of the present invention.

DESCRIPTION OF THE PREFERRED EMBODIMENT

With reference now to the drawings, and in particular to FIGS. 1 through 4 thereof, a new safety leash embodying the principles and concepts of the present invention and generally designated by the reference numeral 10 will be described.

As best illustrated in FIGS. 1 through 4, the safety leash 10 generally comprises an elongate flexible strap 12 having opposite first and second ends 13,14. The first end 13 of the flexible strap 12 is looped through the attachment ring 17 of a first clip member 15. An elongate secondary strap 21 having a pair opposite end portions 22,23 is coupled to the flexible strap 12. The secondary strap 21 is looped through the attachment ring 20 of a second clip member 18.

In closer detail, the elongate flexible strap 12 is preferably generally rectangular and has opposite first and second ends 13,14. Ideally, the flexible strap 12 has a length between its ends of less than about 6 feet, a width of less than about 1¾ inches, and a thickness of less than about ¼ inch.

The first clip member 15 has a spring clip 16 and an attachment ring 17. The first end 13 of the flexible strap 12 is looped through the attachment ring 17 of the first clip member 15 and coupled by stitching to a portion of the flexible strap 12 such that the first clip member 15 is attached to the first end 13 of the flexible strap 12. The spring clip of the first clip member 15 is adapted for attachment to a first pet collar 27.

The second clip member 18 also has a spring clip 19 and an attachment ring 20. The spring clip 19 of the second clip member 18 is adapted for attachment to a second pet collar 28, which is preferably a choke chain or pincher pet collar for training a dog. The secondary strap 21 is looped through the attachment ring of the second clip member 18 such that the secondary strap 21 is folded such that the end portions 22,23 of the strap are positioned adjacent one another. Ideally, the secondary strap 21 comprises leather. The end portions 22,23 of the of the secondary strap 21 are coupled by stitching to the flexible strap 12. The secondary strap 21 is positioned on the flexible strap 12 between the first and second ends 13,14 of the flexible strap 12 towards the first end 13 of the flexible strap 12 such that the second clip member 18 is spaced apart from the first clip member 15.

Preferably, a fastener 24 is extended through the flexible strap 12 and the end portions 22,23 of the secondary strap 21 such that the fastener 24 couples the end portions 22,23 of the secondary strap 21 to the flexible strap 12. The fastener 24 is positioned towards a portion of the secondary strap 21 adjacent the attachment ring of the second clip member 18.

In the preferred embodiment, the second end 14 of the flexible strap 12 forming a handle loop 25.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A leash for attachment to a first pet collar and a second pet collar, said leash comprising:

an elongate flexible strap having opposite first and second ends;

a first clip member having a spring clip and an attachment ring, said first end of said flexible strap being looped through said attachment ring of said first clip member, said spring clip of said first clip member being adapted for attachment to a first pet collar;

a second clip member having a spring clip and an attachment ring, said spring clip of said second clip member being adapted for attachment to a second pet collar;

an elongate secondary strap having a pair opposite end portions, said secondary strap being coupled to said flexible strap, said secondary strap being looped through said attachment ring of said second clip member;

wherein said secondary strap is looped through said attachment ring of said second clip member such that said secondary strap is folded such that said end portions of said secondary strap are positioned adjacent one another; and wherein a fastener is extended through said flexible strap and portions of said secondary strap such that said fastener couples said portions of said secondary strap to said flexible strap.

2. The leash of claim 1, wherein said first end of said flexible strap is coupled to a portion of said flexible strap such that said first clip member is attached to said first end of said flexible strap.

3. The leash of claim 1, wherein said secondary strap is positioned between said first and second ends of said flexible strap towards said first end of said flexible strap such that said second clip member is spaced apart from said first clip member.

4. The leash of claim 1, wherein said fastener is positioned towards a portion of said secondary strap adjacent to said attachment ring of said second clip member.

5. The leash of claim 1, wherein said second end of said flexible strap forms a handle loop.

6. A leash for attachment to a first pet collar and a second pet collar, said leash comprising:

an elongate flexible strap being generally rectangular and having opposite first and second ends;

a first clip member having a spring clip and an attachment ring, said first end of said flexible strap being looped through said attachment ring of said first clip member and coupled to a portion of said flexible strap such that said first clip member is attached to said first end of said flexible strap, said spring clip of said first clip member being adapted for attachment to a first pet collar;

a second clip member having a spring clip and an attachment ring said spring clip of said second clip member being adapted for attach merit to a second pet collar;

an elongate secondary strap having a pair opposite end portions, said secondary strap being looped through said attachment ring of said second clip member such that said secondary strap is folded such that said end portions of said secondary strap are positioned adjacent one another, wherein said secondary strap comprises leather;

said secondary strap being positioned between said first and second ends of said flexible strap towards said first end of said flexible strap such that said second clip member is spaced apart from said first clip member;

a fastener being extended through said flexible strap and portions of said secondary strap such that said fastener couples said portions of said secondary strap to said flexible strap, said fastener being positioned towards a portion of said secondary strap adjacent said attachment ring of said second clip member; and said second end of said flexible strap forming a handle loop.

7. In combination:

a first pet collar;

a second pet collar, said second pet collar comprising a length of chain;

an elongate flexible strap having opposite first and second ends;

a first clip member having a spring clip and an attachment ring, said first end of said flexible strap being looped through said attachment ring of said first clip member, said spring clip of said first clip member being attached to said first pet collar;

a second clip member having a spring clip and an attachment ring, said spring clip of said second clip member being attached to said second pet collar;

an elongate secondary strap having a pair of opposite end portions, said secondary strap being looped through said attachment ring of said second clip member; and wherein a fastener is extended through said flexible strap and portions of said secondary strap such that said fastener couples said portions of said secondary strap to said flexible strap.

* * * * *